United States Patent [19]
Baudelot et al.

[11] Patent Number: 6,104,714
[45] Date of Patent: Aug. 15, 2000

[54] METHOD AND APPARATUS FOR ALLOWING COMMUNICATION IN AN ISOCHRONOUS TRAFFIC OF ASYNCHRONOUS TRANSFER MODE (ATM) CELLS IN A RING NETWORK

[75] Inventors: Francis Baudelot, Nice; Alain Benayoun, Cagnes-sur-mer; Jean-Fracois LePennec, Nice; Patrick Michel, LaGaude, all of France

[73] Assignee: International Business Machines Corporation, Armonk, N.Y.

[21] Appl. No.: 08/932,547

[22] Filed: Sep. 17, 1997

[30] Foreign Application Priority Data

Sep. 26, 1996 [EP] European Pat. Off. .............. 96480100

[51] Int. Cl.[7] .............................. H04L 12/28; H04L 12/56
[52] U.S. Cl. ........................................ 370/396; 370/358
[58] Field of Search ...................................... 370/396, 249, 370/252, 257, 258, 263, 270, 282, 345, 347, 348, 349, 350, 353, 354, 356, 358, 359, 367, 377, 384, 392, 394, 395, 397, 399, 400, 406

[56] References Cited

U.S. PATENT DOCUMENTS

| | | | |
|---|---|---|---|
| 4,858,232 | 8/1989 | Diaz et al. ............................... | 370/465 |
| 5,327,428 | 7/1994 | Van As et al. ........................... | 370/353 |
| 5,436,898 | 7/1995 | Bowen et al. ........................... | 370/352 |
| 5,465,250 | 11/1995 | Brief ....................................... | 370/249 |
| 5,594,734 | 1/1997 | Worsley et al. .......................... | 370/395 |
| 5,724,350 | 3/1998 | Hamada et al. ......................... | 370/392 |
| 5,970,068 | 10/1999 | Gray et al. .............................. | 370/395 |

*Primary Examiner*—Dang Ton
*Assistant Examiner*—Phirin Sam
*Attorney, Agent, or Firm*—Thomas F. Galvin; John B. Frisone

[57] ABSTRACT

A method and apparatus for an isochronous traffic of Asynchronous Transfer Mode (ATM) cells in a ring network having at least two stations (101,102) and a ring server (001). The communication within the ring is based on specific isochronous control and data cells. The control cell contains a cell header, sequence number, type of command and parameter fields. The data cell contains a header and a payload divided into N m-bit slots. The isochronous data cells are shared by a plurality of stations on the ring by allocating corresponding slotlist whose identification is carried in the parameter field. Furthermore, the server provides for each station's communication link a transmit identifier in the header associated to a reference in a list of allocated slots for transmission and a receive identifier associated to a reference in a list of allocated slots for reception. The implementation of two pairs of registers whose bits correspond to each byte of the isochronous data cell enables processing in real time transmission and reception of the isochronous data cells and to concatenate the bytes to be stored in a memory and to transmit transparently unmodified or substituted bytes on the ring.

9 Claims, 11 Drawing Sheets

ATM isochronous control cell

ATM isochronous data cell
data = 48 slots of 8 bits

METHOD AND APPARATUS FOR ALLOWING COMMUNICATION IN AN ISOCHRONOUS TRAFFIC OF ASYNCHRONOUS TRANSFER MODE (ATM) CELLS IN A RING NETWORK

TECHNICAL FIELD OF THE INVENTION

The invention relates to telecommunications and more particularly to a method and apparatus for allowing isochronous communication of data having fixed or variable lengths between a plurality of adapters connected in a ring network.

BACKGROUND ART

Most Local Area Networks (LANs) in use today are shared media LANs, Carrier Sense Multiple Access with Collision Detection (CSMA/CD) used on the Ethernet (802.3) bus or token-passing used on the token-ring LAN or Fiber Distributed Data Interface (FDDI). In some cases, there is a need for more bandwidth and facility to transport video, voice and data. Asynchronous Transfer Mode (ATM) is a transmission technology designed to transport these various traffic through LANs and through WANs. ATM is an emerging technology for cell relay and defines a fixed length 53-byte packet or cell which consists of a five-byte header and 48 bytes of user information or payload as defined by CCITT (now called ITU-T). ATM was originally viewed as a technology integrating all types of traffic, but it has been dedicated later on to the interconnection of LAN and powerful technical workstations.

The five-byte header, Network Node Interface (NNI) has a first field of 12 bits called Virtual Path Identifier (VPI), a second field of 16 bits called Virtual Channel Identifier (VCI): together these two fields identify the connection, the function is similar to the Logical Channel Identifier (LCI) in X.25 or the Data Link Control Identifier (DLCI) of frame relay.

The additional fields are: the Payload Type (PT), the Cell Loss Priority (CLP), and the Header Error Check (HEC). VPI and VCI will also be called hereafter VP and VC.

More details may be found in general documentation relating to ATM, and particularly IBM redbook GG24-4330: ATM, Technical Overview; and GG24-3178: Local Area Network, Concepts Products.

Numerous topologies are used for local area networks. The basic networks topologies are: Mesh topology, Star topology, Bus and tree topology and Ring topology. In a network that has a ring topology, each station is attached to its adjacent station by point-to-point links, thus forming a physical ring. Each station's adapter regenerates the signal as it retransmits a data packet that is circulating on the ring.

A popular protocol used with the ring topology is token-passing, in which access to the medium is controlled by possession of a circulating token. Only one token may exist on a ring segment at any given point in time. The token is a specific bit sequence (24 bits) circulating around the ring.

In an ATM ring environment dedicated to asynchronous data transfer, the transmission of isochronous traffic related to data, voice and video is not easy to perform because of the rule of priority. Indeed, the isochronous frames are to be sent/transmitted on the ring periodically, for instance, every 125 µs. Therefore, the problem is to find a way to merge isochronous traffic and asynchronous traffic on an Asynchronous Transfer Mode ring.

The environment of the present invention is related to European patent application EP 95480102.3, "Method and Apparatus for Allowing Communication of Asynchronous Transfer Mod Cells in a Ring Network."

SUMMARY OF THE INVENTION

One object of the invention is to permit isochronous traffic communication of different ATM equipment in a ring topology.

Another object of the invention is to enable the transport of voice and video which requires an isochronous traffic by merging voice, video and asynchronous data on a same ATM ring.

It is also an object of the invention to use a single multimedia adapter for voice, video and data.

It is a further object of the invention to have a dynamic allocation of voice/video bandwidth and to save bandwidth for multicast operation.

Finally, it is an object of the invention to resolve the problems of isochronous transport jitter and delay.

According to the present invention, an apparatus for allowing isochronous communication of frames containing asynchronous transfer mode (ATM) cells between a plurality of adapters connected in a ring network that comprises at least a first station A, a second station B and a third station operating as a ring server for controlling and managing isochronous traffic; said frames having a structure is composed of: a Frame start delimiter (START), a TOKEN field used by each station for requesting access to the next frame, an ACCESS field including a first LEVEL field, a field designed to receive the contents of an ATM cell, a Frame ending delimiter (STOP); said apparatus characterized in that said isochronous frames are of two kinds:

- Σ an isochronous control cell containing a cell header, a sequence number field (Snum), a type of command field (Action) and a parameter field; and
- Σ an isochronous data cell containing a header and a payload divided into N m-bit slots.

In another embodiment, the isochronous data cells used in the apparatus of the present invention are shared by a plurality of stations on the ring by allocating corresponding slotlist whose identification is carried in the parameter field. Furthermore, the server provides for each station's communication link a transmit identifier in the header associated to a reference in a list of allocated slots for transmission and a receive identifier associated to a reference in a list of allocated slots for reception. The implementation of two pairs of registers whose bits correspond to each byte of the isochronous data cell enables processing in real time transmission and reception of isochronous data cells and to concatenate bytes to be stored in a memory and to transmit transparently unmodified or substituted bytes on the ring.

The method to be used in connection with the above apparatus is characterized in that the isochronous communication is only handled by the server. According to the invention, the isochronous connection comprises the steps of:

(a) requesting bandwidth from the server with an isochronous control cell generated by a station;

(b) generating by the server an isochronous data cell containing the requested bandwidth on the ring;

(c) processing the isochronous data cells by stations connected on the ring allowing a simple multicast of the cell on the ring; and (d) storing in the server the isochronous data cell after a ring turn, and retransmitting the cell on the ring after a predetermined period.

The release of an isochronous connection comprises the steps of:

(a) requesting the server by sending an isochronous control cell with a release command in the action field; and (b) releasing the slots corresponding to the connection and discarding the isochronous data cell if all the slots are released.

DESCRIPTION OF THE PREFERRED EMBODIMENT OF THE INVENTION

It should be kept in mind that the present invention is based on the environment disclosed in the European patent application EP 95480102.3 whose title is, "Method and Apparatus for Allowing Communication of Asynchronous Transfer Mode Cells in a Ring Network" and which will be referred to later on as "related document."

In FIG. 1, a ring has two stations 101 and 102, one ring server 001 and a router 200. Server 001 provides control of the ring, including control of isochronous traffic of voice and video, integrity control and failure management. It adapts the length of the frame which may include one or several ATM cells depending on the number of users and affects the different Virtual Paths (Vp) and Virtual Circuits (Vc) for each communication between two stations in the ring.

It should also be kept in mind throughout the description that voice and video traffic are called isochronous traffic, whereas data traffic is asynchronous. In addition, isochronous traffic has the highest priority and the isochronous frames are sent every 125 µs.

Figure 1A:
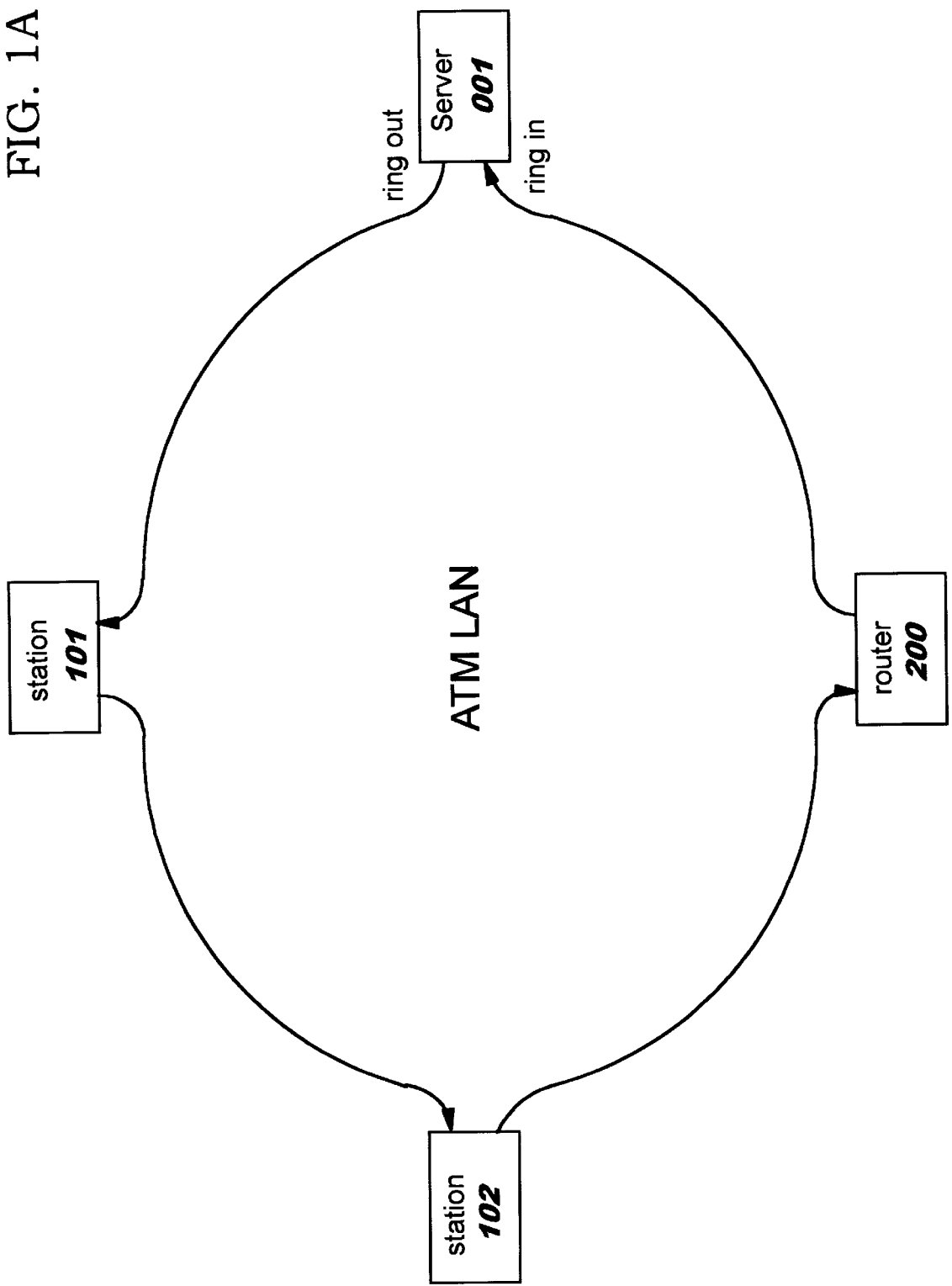
FIG. 1A is an overall view of the ring topology according to the present invention.
Figure 1B:
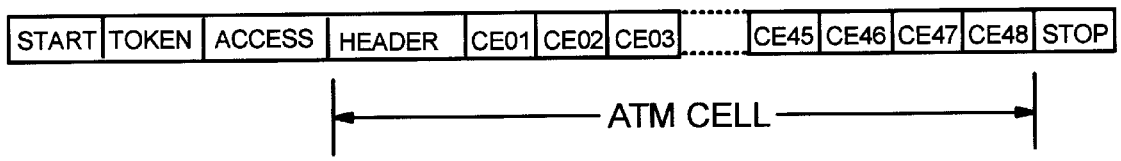
FIGS. 1B, 1C and 1D respectively show the structures of a general ATM frame, an ATM isochronous control cell and an ATM isochronous data cell.

Communication between the stations, the server and optionally the router is based on the frame structure shown in FIG. 1B. In this figure, START and STOP fields are frame delimiters. In one embodiment, the START pattern may be, for instance, the 'JK' violation of the 4B/5B of the FDDI start delimiter.

ACCESS and TOKEN are fields which are used for managing priority in accordance with the present invention and allow the use of the ATM cell. These different fields will be described hereinafter in greater detail.

Σ The token byte will be |PRIORITY|T|

Σ The access byte will be |LEVEL |B|

The remaining part of the frame (Header, CE01 . . . CE48) comprises the traditional ATM cell including the header and the payload.

The token is very specific and has several functions. It allows a station to request access to an ATM CELL; however, the request is for the next ATM CELL, not for the current one. This allows multiple requests to append and to be distributed among several stations. The token byte is divided in two fields, one is the Type field (T) of one bit used to make a difference between usual ATM frames and control or special frames. It is set to a logical value 0 for normal ATM data frames, and at a logical value 1 in other cases. The second one is the priority value of the request (7 bits).

The access byte is divided in two fields: the level field (7 bits) contains the highest priority field of the previous frame if the current cell is free. As soon as an adapter finds that this field is equal or less than its own priority, it takes the cell and sets this level field to 1111111B to avoid other adapters taking this frame. The Broadcast bit (B) indicates whether the frame is a normal data transfer between two adapters or a broadcast frame. The difference for the other adapters on the ring is that they should not discard this broadcast frame even if they find that they have to receive it. Only the originator of a broadcast frame is able to suppress it, and the ring server, of course, for error management.

Figure 1C:

The general structure of an ATM isochronous control cell is shown in FIG. 1C where the HEADER comprises the traditional fields, including VPI and VCI fields; and where the payload part of the ATM cell comprises the following fields:

Σ Snum is the sequence number byte;

Σ Action is the type of command: Registration, Connection (asynchronous or isochronous), disconnection, control, diagnostic, statistic and so on;

Σ Parameters are all the parameters corresponding to the requested action like station identification, protocol, functions used, the slot numbers for the isochronous connection (the requested bandwidth) and so on.

Figure 1D:
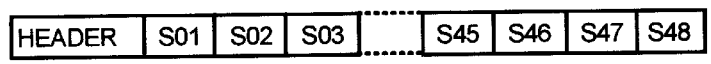

The ATM isochronous data cell generated by the server is shown in FIG. 1D. The data field of an ATM isochronous data cell is divided into 48 slots of 8 bits (S01 to S48). The server provides to each station a transmit Vp/Vc associated with a list of allocated slots for transmission and a receive Vp/Vc associated with a list of allocated slots for reception of each other's station. These isochronous data cells are not dedicated to one isochronous connection but shared by multiple connections. The sharing is performed by allocation of bandwidth in the form of VpVc/slotlist. It should be noted that an ATM cell can be divided into N slots of m bits.

In addition to the features disclosed in the related document, the preferred embodiment of the present invention uses an isochronous cell which has the highest ACCESS 1111111 with the Broadcast bit set to 1. Empty isochronous data cells are generated by the server if the new connection requests more bandwidth than available in already existing cells.

The bandwidth allocated to isochronous traffic is controlled by a threshold. A minimum of asynchronous traffic is required for the control and management operations in order to have a maximum of isochronous traffic on the ring.

When an isochronous station receives a cell in which slots are dedicated to transmission, it forwards the cell transparently, except its allocated slots on transmission, which are overwritten.

When an isochronous station receives a cell in which slots are dedicated to the reception of one of its station(s), it forwards transparently the packet and reads the data addressed to it. The SAME cell can be read by each station of the connection. It allows a simple multicast for the bandwidth.

When the isochronous data cell returns to the server after a ring turn, it is stored by the server and retransmitted 125 μs later. Thus, the receiving stations placed between the server and the emitting station can read the contained data. Then, the emitting station overwrites its allocated transmission slots for the next data.

When the connection is released (through a control cell exchange), the slots are freed by the server. When all the slots of a cell are freed, the cell is discarded by the server.

Figure 2A:
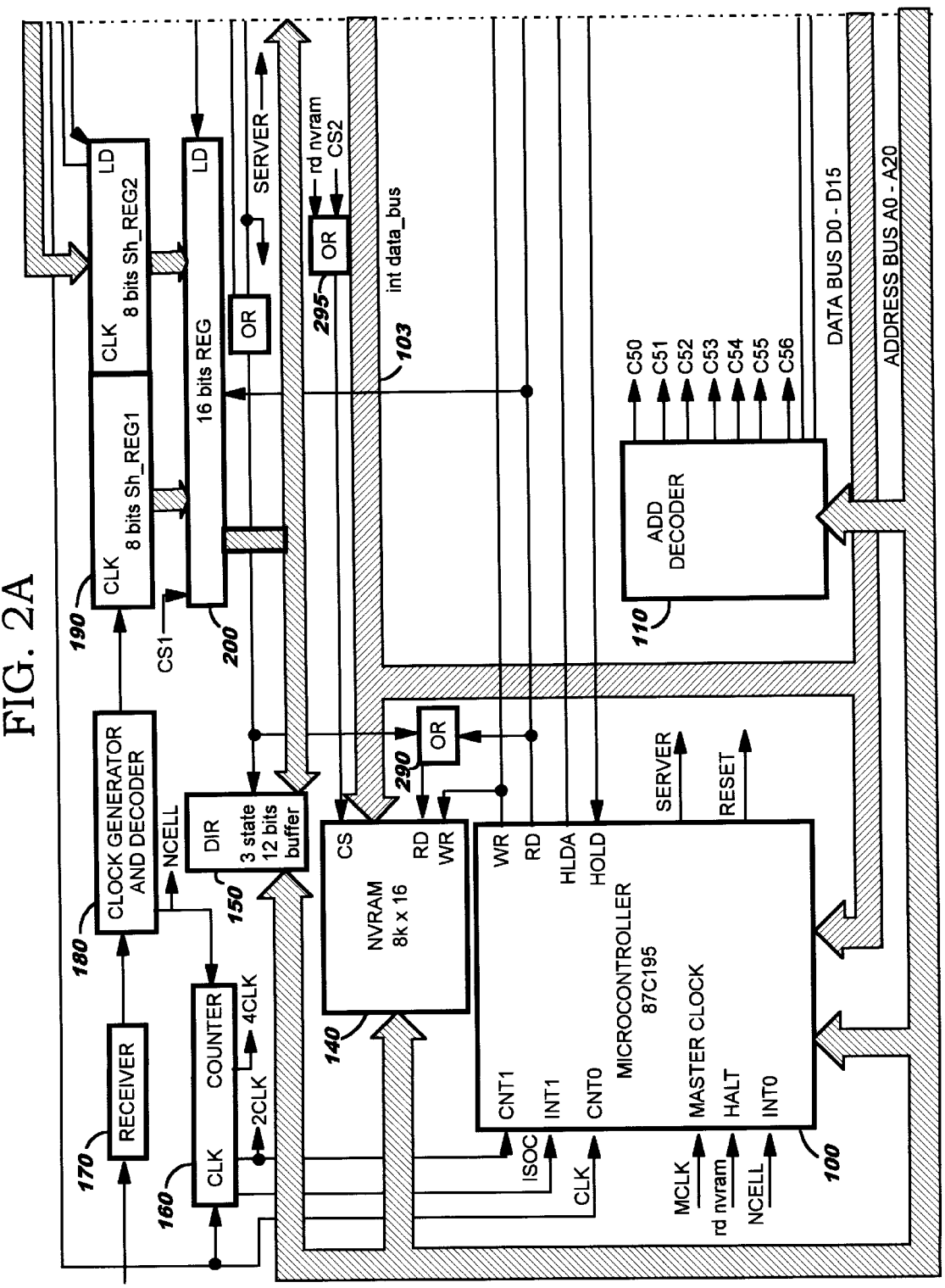
FIGS. 2A, 2B and 2C illustrate the structure of the hardware adapter behaving as a station or a server in the preferred embodiment of the invention.
Figure 2B:
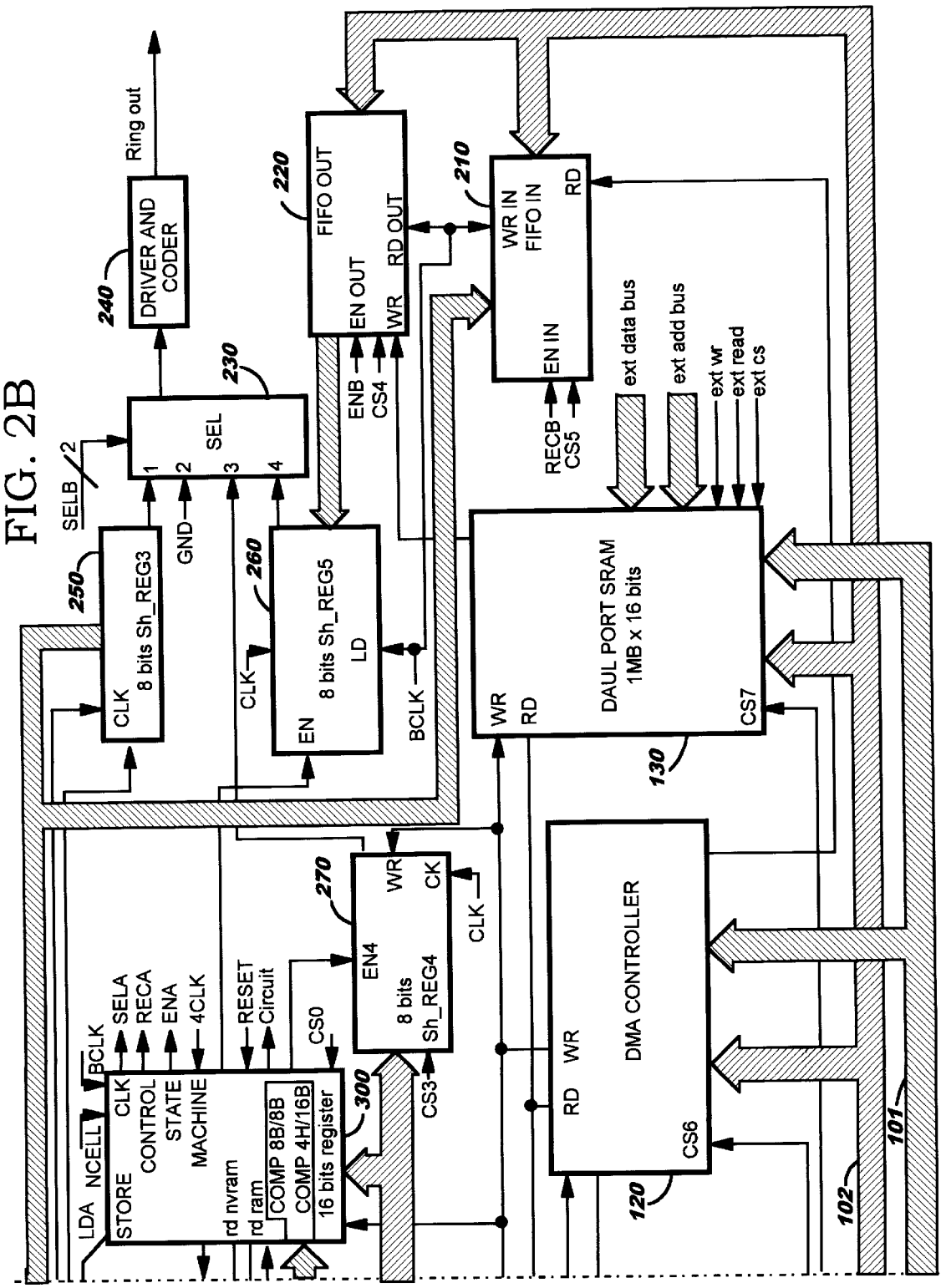
Figure 2C:
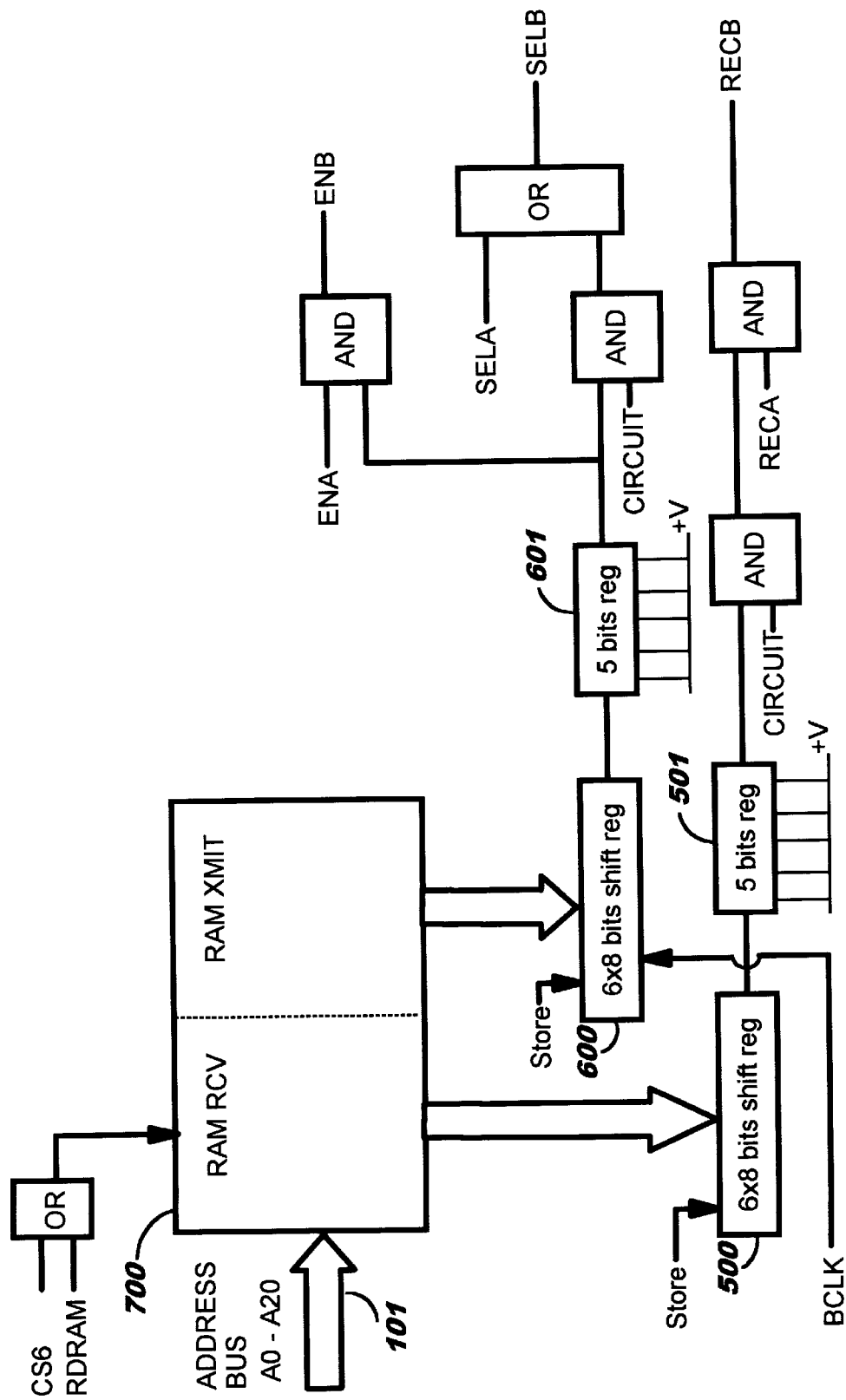

This adapter (FIGS. 2A, 2B and 2C) interface behaves as a station or a server. It comprises a micro-controller 100 which may use, for instance, an INTEL 87C196 micro-controller. The latter communicates via an A0–A20 address bus 101 to an Address Decoder 110 for providing the different $chip_{13}$ select signals that are needed in the different elements of the adapter, a Direct Memory Access (DMA) controller 120, a RAM storage 130 which may be a DUAL PORTS Read Access memory, a NVRAM 140 and a tri-state 12-bits buffer 150. Micro-controller 100 is also connected via a D0–D15 data bus 102 to Address Decoder 110, DMA controller 120, DUAL I Static RAM 130, NVRAM 140, a FIFO_In buffer 210, a FIFO_Out buffer 220, an 8-bit Sh_REG4 buffer 270 and to a 16-bit register which is included in a Control circuit 300. As will be described hereinafter in detail, the latter 16-bit register is used for managing the token and access priority by the processor 100.

In addition to the features disclosed in the related document, the preferred embodiment of the present invention further comprises a RAM 700 which is connected to address bus 101 and registers 500 and 600. Register 500 is in series with register 501. Register 501 gates the REC signal of FIFO 210. Register 600 is in series with register 601. Register 601 gates selection bits of selector 230 and signal ENOUT of FIFO out 220. A signal circuit gates the action of outputs of registers 501 and 601.

The LAN adapter receives the frames from the ring at a Ring_in input lead of a receiver block 170 which provides the decoding of the delimiters of the frame. The frame is then transmitted to a clock generator and decoder circuit 180 which extracts a New_Cell (NCELL) synchronization signal, as well as an appropriate clock signal, in accordance with the standard and protocol being used, for instance, the Manchester coding or 4B/5B coding, etc. The digital data being decoded and extracted from block 180 is then transmitted to the serial input of a set 190 comprising two 8-bit registers Sh_Reg1 and Sh_Reg2, the latter receiving the serial data from the former. The serial output of the Sh_Reg2 register of block 190 is connected to the serial input of an 8-bit Sh_Reg3 register 250 which has an output which is connected to a first input lead of a selector 230. Selector 230 has an output which is connected to a coder and driver circuit 240 which allows the connection to the Ring_out output lead. Selector 230 is controlled by means of a 2_bit SEL control bus connected to Control State Machine 300. Coder and driver circuit 240 provide the physical and logical coding in accordance with the standard being chosen, e.g., the Manchester or 4B/5B. These well-known operations are not part of this invention and will not be described in further detail.

The LAN adapter further comprises additional circuitry, particularly an 8-bit shift register 260, a 16-bit register 200 and a set of two OR gates 290 and 295 which will be described with reference to the functional description below.

The functional operations of the LAN adapter which may operate as a station or a server will not be described in detail with reference to the flow chart illustrated in FIG. 3. For clarity's sake, the flow of operations is illustrated in this figure under the form of a state machine diagram.

The machine is initialized after the power-on or a reset of the machine during state 10. To achieve this, an Enable (EN) control signal is first generated and transmitted to 8-bit shift register 260 and FIFO_OUT circuit 220. Control state machine 300 also generates a first value '1' among the four values which can be transmitted by two bit SEL bus. This value results in Selector 230 being set to select the data provided by 8-bit shift register 250. This initialization procedure results in the machine being set in a transparent mode, that is to say the frames which are received in receiver 170 are transmitted to driver 240 via the succession of circuits 180, 190, 250 and 230. In addition, an internal broadcast (B) register in control state machine 300 is set to default value 0 (characterizing the no broadcast mode). Furthermore, a circuit register is set to 0, and a server register to 0 if the adapter is a station and to 1 if the adapter is a server.

Then the initialization process proceeds with step I1. Upon detection of byte clock (BCLK) signal produced by counter 160 which receives the input frame as well as the clock extracted from clock generator and decoder 180, the previously Enable lead (EN) set to 1 on step 10 is reset to its default value 0. In this way, the 8-bit shift register Sh_reg5 260 is loaded with the first byte of the frame corresponding to the ACCESS field content which value will be either FFH or FEH. The remaining part of the frame being still ready into the FIFO_OUT register 220, pre-loaded by micro-controller 100 and DMA controller 130.

Finally, the initialization procedure completes with the setting of the 16-bit register into state control machine 300 to the lowest priority and access value. However, it should be noted that the processor 100 will, at any time, be able to change and update the contents of this 16-bit register (for the purpose of requesting a token in order to transmit data).

Figure 3:
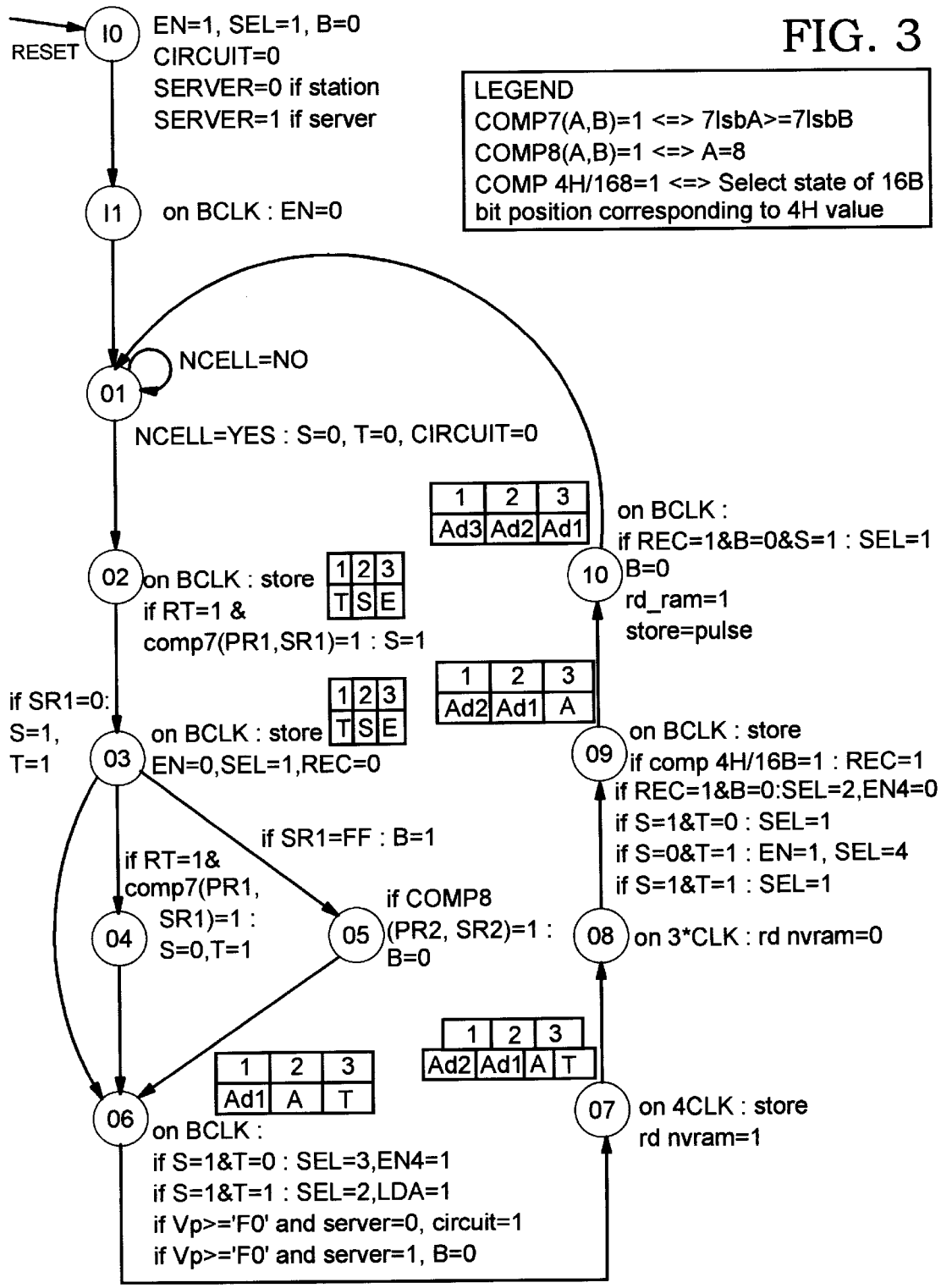
FIG. 3 is a diagram illustrating the operation of the state machine which controls both the reception and transmission of the data received and/or transmitted. Router 200 is a particular station which provides the connectivity to external devices such as remote native ATM stations, etc.

When the initialization procedure completes, the process proceeds to state 01 of FIG. 3. As long as receiver 170 does not detect any new cell, that is, has not yet decoded the existence of a START field in the data flow, the process remains in state 01. On the contrary, when a new cell is detected (represented in FIG. 3 by the NEWCELL field being set to YES), state control machine sets internal S and T circuit bit registers to zero. The process then proceeds to state 02. Counter 160 receives the clock signal provided by clock generator 180 and produces a byte clock signal (BCLK) which is transmitted into various locations in the machine, and particularly to micro-controller 100 and state control machine 300. Upon detection of the byte clock that follows the receiving of the START field, state control machine 300 generates an active STORE signal which is transmitted to a LOAD input (LD) of 16-bit bit register 200. This allows the token which exists in the 8 first locations of the register 190 to be transferred and stored inside 8-bit register 200.

Then, if the adapter is requesting the token in order to transmit data, state control machine 300 detects that internal 16 bits register 300 is not equal to 0000H and state control machine 300 performs a comparison between the value of the 7 MSB of the token and the contents of the 7 corresponding bits which are loaded into 16-bit internal register of circuit 300. If the comparison reveals that the token which was received has a lower priority access than that which was recorded in the 16-bit register, then state control machine sets its internal S register to a logical ONE. The process then proceeds to state 03.

In state 03 the machine monitors the next Byte_clock (BCLK) signal produced by counter 160 which corresponds to the storage of the ACCESS byte into Sh_Reg1 of the register 190. Similarly, as above, upon detection of BCLK signal, state control machines generate a load (LD) control signal to 16-bit register 200 in order to transfer the contents of register 190 into 200. Then, State control machine sets Enable (EN) and a Record (REC) control signals to a logical one. The latter REC signal is transmitted to the Enable input lead of FIFO_IN circuit 210. Also, the 2-bit SEL bus is set to carry the value of the first position of selector 230. The contents of the 8 bits of the ACCESS field is then compared either with zero and 'FF'. If the ACCESS field is equal to 'FF', state control machine sets an internal bit B to one (broadcast mode) and proceeds to state 05. If the field is equal to zero, state control machine 300 sets the two bits S and T to a logical one, which corresponds to a reset of the token and makes a copy of the token to the access field. The process then goes to state 06.

In state 05, state control machine 300 performs a comparison between the 8 last bits of register 200 with the 8 last bits of its 16-bit register. This allows a comparison between the token (that is preceding the access byte in register 200) and the value stored into the 16 bit register. If the two values are found to be identical, state control machine 300 will reset its internal register in order to clear the internal broadcast token. This allows the LAN interface to generate broadcast token which will circulate throughout the ring with the possibility of clearing it when the token will complete its transmission through the ring.

If the ACCESS field has a value which is neither equal to zero or 'FF' (that is to say its value is comprised within the range 01 and FE), the process proceeds to state 04. If the Request_Token (RT) internal bit is at a logical one a further comparison is performed. The 7 MSB of the register 200 (corresponding to the ACCESS field) are compared with the corresponding bits of the 16-bit internal register of state control machine 300. If the comparison indicates that the priority of the current frame is lower than the value recorded in its 16-bit register of state control machine 300, then the internal S and T bits are respectively set to a logical Zero and a logical One. This means that the Cell is free and the priority of the adapter is higher than that of the frame. Therefore, the adapter becomes able to use this frame to transmit its own data.

The process then proceeds to state 06 where the machine monitors the next BCLK byte clock pulse produced by counter 160 which corresponds to the storage of the first address byte (eight first bits of the VP field of the ATM header) into SH_REG1 of register 190. Upon the detection of the BCLK pulse, a set of parallel operations are performed in order to process internal registers S and T.

A first operation consists in the processing of the token field in the ATM frame when required. If its internal registers S and T are respectively set of a logical one and a logical zero, control state machine 300 activates SEL control bus so that selector 230 performs the selection of the third input which is connected to the output of 8 bits SH_REG4 register 270. This situation occurs when the current priority of the token which is received from the ring is lower than the priority that is requested by the particular adapter at this location in the ring. This adapter will replace the priority which circulates on the ring by its own superior priority. To achieve this, control state machine 300 activates EN4 control lead to let the contents of SH_REG4 register 270 be successively transferred to the third input of selector 230 so that it supersedes the token contained into SH_REG3 register 250.

This is achieved by means of micro-controller 100 which controls the transfer of the new token (including the 7_bit PRIORITY field and the additional TYPE bit). The transfer of this new token is practically performed by the generation of the Write, CS3 chip select control signals which are well known in the data processing art. It should be noted that the preloading of register 270 is under the control of the micro-controller 100 and can occur at any time and in any state of control state machine 300.

A second operation consists in the processing of the ACCESS field in the ATM frame in the case where the ACCESS byte is equal to zero, which occurs when the previous adapter in the ring has received an ATM frame and has decided to clear the ACCESS field. In this case, the next adapter has to reset the token field and copy the contents of the TOKEN field into the ACCESS field or byte. As mentioned above, when the ACCESS field was detected to be equal to zero in state 03, the S and T bits were both a logical one. Therefore, in state 06, when the two latter bits are detected to be a logical one, control state machine 300 generates a LDA load control signal to SH_REG2 register 190 as well as a SEL control word to the input of the selector 230 so that the latter selects its second input which is connected to ground (logical zero). This LDA load control signal results in the copying of the contents SH_REG3 register 250 into SH_REG2 register of circuit 190. Therefore, the token that was stored in the former register is copied and now replaces the empty ACCESS field loaded in the latter register.

In addition to the features disclosed in the related document, the preferred embodiment of the present invention further comprises a third operation which consists in detecting if the packet is for isochronous or asynchronous data. It is achieved by comparing the 8 MSB of the Vp value with the value 'F0'x. If Vp is higher or equal to F0, it means that the traffic is isochronous. If Vp is higher or equal to F0 and server equal to 0, then the 'circuit' signal is set to 1. If Vp is higher or equal to F0 and server equal to 1, then B is set to 0. To allow this comparison, Vp which is on the 8 first positions of register 190, is transferred and stored in register 200. For this purpose, on BLCK, the state machine 300 generates an active store signal which is transmitted to the LOAD input of register 200. The process then proceeds to state 07.

In state 07, control state machine 300 monitors the occurrence of the half byte clock pulse of the next clock period. This is achieved by the detection of a 4CLK control pulse that is produced by counter 160 after a period of exactly 4 elementary (CLK) clock pulse after the previous (BCLK) Byte clock pulse. It should be noted that the occurrence of the 4CLK control pulse coincides with the storage into shift register 190 of the twelve first address bits of the ATM cell (8 bits of AD1 address and 4 additional bits of AD2 in FIG. 4) that represents the ATM Vp field. At the detection of the 4CLK pulse, control state machine 300 activates a STORE control signal which is transmitted to the LOAD (LD) input of register 200. This results in the transferring of the contents of register 190 into register 200. Also, machine 300 activates a RD_NVRAM control signal to access the Non-Volatile (NVRAM) memory 140. TP control signal causes some different actions. Firstly, the latter RD_NVRAM is transmitted to the DIR input lead of 12-bits tri-state bidirectional buffer 150 in order to reverse the direction of buffer 150. Therefore, the output of register 200 (carried on the internal data bus 103) may be used as an address to access NVRAM memory storage 140. Secondly, the RD_NVRAM control signal provided by control state machine 300 is transmitted to a first input of OR gate 290 which output is used for driving the READ input lead of NVRAM storage 150. Similarly, the RD__NVRAM control signal is provided to a first input of gate 295 which output is used for controlling the chip select input of NVRAM storage 150. This causes the latter storage to be selected. The NVRAM then initiates a read operation at the location that is defined by the twelve bits forming the Vp field of the ATM cell. Thirdly, the RD__NVRAM signal is transmitted to micro-controller 100 in order to halt the latter during the READ action of the NVRAM storage 140 by control state machine 300.

Next, state 08, an internal delay process is introduced in order to fit the specific requirements of the NVRAM storage that is used. Indeed, as known in the art, the NVRAMs that are available often require some delay to present the data on their outputs. Depending on the internal characteristics of the particular NVRAM that is used for the embodiment of the invention, and especially if high speeds are involved (e.g., clocks which operate at 100 MHZ or above), it may be necessary to incorporate into the process an internal delay in order to fit the requirements of the NVRAM storage. An additional delay of 3 elementary clock pulses is introduced. Therefore, and assuming that the ring operates a 100 Mbps, this 3__clock delay process allows the possibility to use NVRAM that has an access time of about 30 nanoseconds. However, it should be noted that this additional delay process is not critical since one can either change the technology of the NVRAM being used, or use a fast RAM storage that has its own external battery backup. Another possibility to fit the requirements of the NVRAM while allowing very high speed operating is to provide additional latches or registers to increase the length of register 190. Such minor adaptations will be easily performed by those skilled in the art.

At the end of the 3 clock periods the data that is extracted from the NVRAM 140 is directly transmitted to the 16 bits internal register of machine 300 via bus 102. State control machine 300 then releases the RD__NVRAM control signal. The process then proceeds to state 09.

In state 09, control state machine 300 monitors the occurrence of the next BCLK Byte clock pulse which corresponds to the storage into SH__REG1 of register 190 of the second byte (AD2) of the ATM address. At this time, the four Least Significant Bits of SH__Reg register 190 corresponds to the four Most Significant Bits of the Vc field of the ATM cell. The contents of the register 190 are then loaded into register 200 by means of the appropriate CS1 chip select and LD load control signals which are generated by machine 300. Then, five distinctive parallel processes are operated in state 09.

A first process is involved in order to determine the value of the bit among the 16 bits of the 16-bit internal register of machine 300, the position of this bit being determined by the value of Vc in hexadecimal notation that is carried by the four LSB of register 200. This process is achieved by means of a 16 input selector that has a 4__bit control bus. The design of such a circuit will be straightforwardly performed by the skilled man. In accordance with the result of this determination, control state machine 300 sets a REC internal latch and correspondingly activates a REC control lead which is transmitted to the Enable__In (EN__IN) input lead of FIFO__IN circuit 210.

A second process is involved which consists in the testing of the two REC and B internal latches. If REC latch is positioned to a logical ONE while the B internal latch is positioned to a logical ZERO, then control state machine 300 generates a SEL control word which entails the positioning of Selector 230 to select its second input. This situation occurs when a frame has to be stored (i.e., REC being equal to ONE) and, additionally, when this frame is not a broadcast one (represented by B equal to ZERO). In this situation, since selector 230 is positioned to its second input, the ACCESS field is cleared.

A third process is also executed, whatever the value of REC internal latch is, which tests the logical states of the S and T internal latches. When the two latter latches are respectively equal to ONE and ZERO, control state machine 300 generates a low level on its EN4 control lead which is transmitted to the Enable input lead of register 270. Also machine 300 produces a SEL control word that controls selector 230 to select the first position of its four input lead. This situation occurs when the priority of the current token was formerly replaced by a new priority in state 06, and the loading of the 16 bit internal register of machine 300 being completed it is now necessary to deactivate EN4 control lead. In this case, the control of selector 230 causes the access field (which is loaded into register 250) to be transferred to the ring.

The fourth process is also executed which, as above, tests the contents of the S and T internal latches. When the two latches are respectively found to be equal to ZERO and ONE, control state machine generates a high output on its EN control lead which is transmitted to the Enable input lead of register 260 and FIFO__OUT circuit 220. Also machine 300 produces a SEL control word that controls selector 230 to select the fourth position of its four input lead. This situation occurs when the adapter that is processing the frame starts to transmit its own ATM cell which is preceded by an ACCESS field which is set to 'FF' (in hexadecimal) or 'FE' (in hexadecimal) depending on the fact of the cell being broadcast or not. In this case, SH__REG5 shift register 260 has its Enable input which is activated and therefore allows the transfer of the data from FIFO__OUT 220 to the ring via driver 240. It should be noted that the FIFO__OUT circuit 220 is under control of micro-controller 100 and DMA controller 120 which allows the data which are stored in RAM storage 130 to be transferred to FIFO__OUT circuit 220. Such basic data transferring is well known in the art and will not be described in further detail. Conversely, micro-controller 100 and Direct Memory Access 120 are capable of extracting the contents of FIFO__IN circuit 210 for their storage into RAM storage 130.

Finally, a fifth process is executed which consists in the testing of the logical states of the S and T internal latches. When the two latter latches are both equal to ONE, control state machine 300 produces a SEL control word that controls selector 230 to select the first position of its four input leads. This situation occurs when the ACCESS was cleared by the preceding adapter in the ring, which situation resulted in state 06 in the selection of the second position of selector 230 (SEL=2). In this case, the selector 230 is repositioned so as to permit the direct transfer of the contents of SH__REG3 register 250—that is, the ACCESS field which was received from the ring, to driver 240.

It should be noted that machine 300 is provided with an internal circuit that allows priority management, SEL=4 being the highest while SEL=1 being the lowest priority. The process then proceeds to state 10.

In state 10, control state machine 300 monitors the occurrence of the next BCLK Byte clock pulse which corresponds to the storage into SH__REG1 of register 190 of the next byte of the ATM header. Upon detection of this BCLK clock pulse, control state machine tests the state of REC, B and S internal latches. If the latter are respectively found to be equal to ONE, ZERO and ONE, machine 300 generates a SEL control word that causes selector 230 to select the first input. This happens after the clearance of the ACCESS field in state 09 (which needed the selector 230 to be positioned to SEL=2) in order to allow the normal transmission from register 250 to the ring. In any case, the internal B latch is reset to a logical ZERO.

In addition to the features disclosed in the related document, the preferred embodiment of the present invention has the state machine 300 activated a STORE control signal which is transmitted to the LOAD (LD) input of register 200. This results in transferring the contents of register 190 in register 200. Thus, the state machine 300 activates a RD_RAM control signal to access the RAM 400. The RD_RAM and RD_NVRAM signals are transmitted through a gate to the DIR input lead of 12 bit tri-state bidirectional buffer 150 in order to reverse the direction of buffer 150. Therefore, the output of register 200 can be used as an address to access the RAM 700. This causes the latter to be selected. The RAM then initiates a read operation at the location defined by the 4 LSB of Vp and 8 Vc bits. Then, the RD_RAM signal is transmitted to the microprocessor 100 to halt the latter during the read action of RAM by registers 500 and 600. The value is stored in registers 500 and 600.

Register 500 is used for slots on reception. Each bit of the register 500 corresponds to a data byte of an ATM cell; each bit of register 501 corresponds to a data byte of an ATM cell; each bit of register 501 corresponds to a header byte of the ATM cell. A value of the bit equal to 1 means that the byte is to be read by the FIFO_IN 210. A value equal to 0 disables the read operation. Thus, the bytes to be received are concatenated and stored in memory.

Register 600 is used for slots on transmission. Each bit of registers 600 (for ATM data field) and 601 (for ATM header) allows selector 230 to switch in order to transmit transparently the byte in register 3 or to substitute the byte to be sent through the FIFO OUT 220 and register 260. The signal circuit allows to disable the action of registers 500, 501 and 600, 601 when the processed cell is not isochronous. Afterwards, the process proceeds to state 01.

A detailed description of the general protocol that is used between the different adapters in order to share the same ring and exchange data follows. This description will be made in reference to FIGS. 4, 5 and 6.

The general protocol basically begins with a first initialization procedure that consists of a Station Registration mechanism being effective at the beginning of the operating of the ring, at the installation of the stations. This is then followed by the general communication mechanism that allows communication between two stations within the ring or a station with a router located within the ring in order to access a remote station.

The Station Registration mechanism starts as follows. Each station has a predetermined Station Identification (Station ID) number which is used for identifying this station with respect to the others. After power-on, each station, station A for instance, tries to contact the Ring Server (defined by a particular ID number for instance). To achieve this, station A generates a control cell which comprises a particular value of VP (for instance, the value zero may be reserved for distinguishing this communication with the ring server) as well as a token field which comprises a type field being set to 1 (control mode). The remaining bits are set in order to form a priority field which will be generally set to define a low priority level as the delay for this connection request is not critical. This Registration control ATM cell which is similar to the ATM isochronous control cell, conforms to the general structure as is shown in FIG. 1C.

Figure 4:
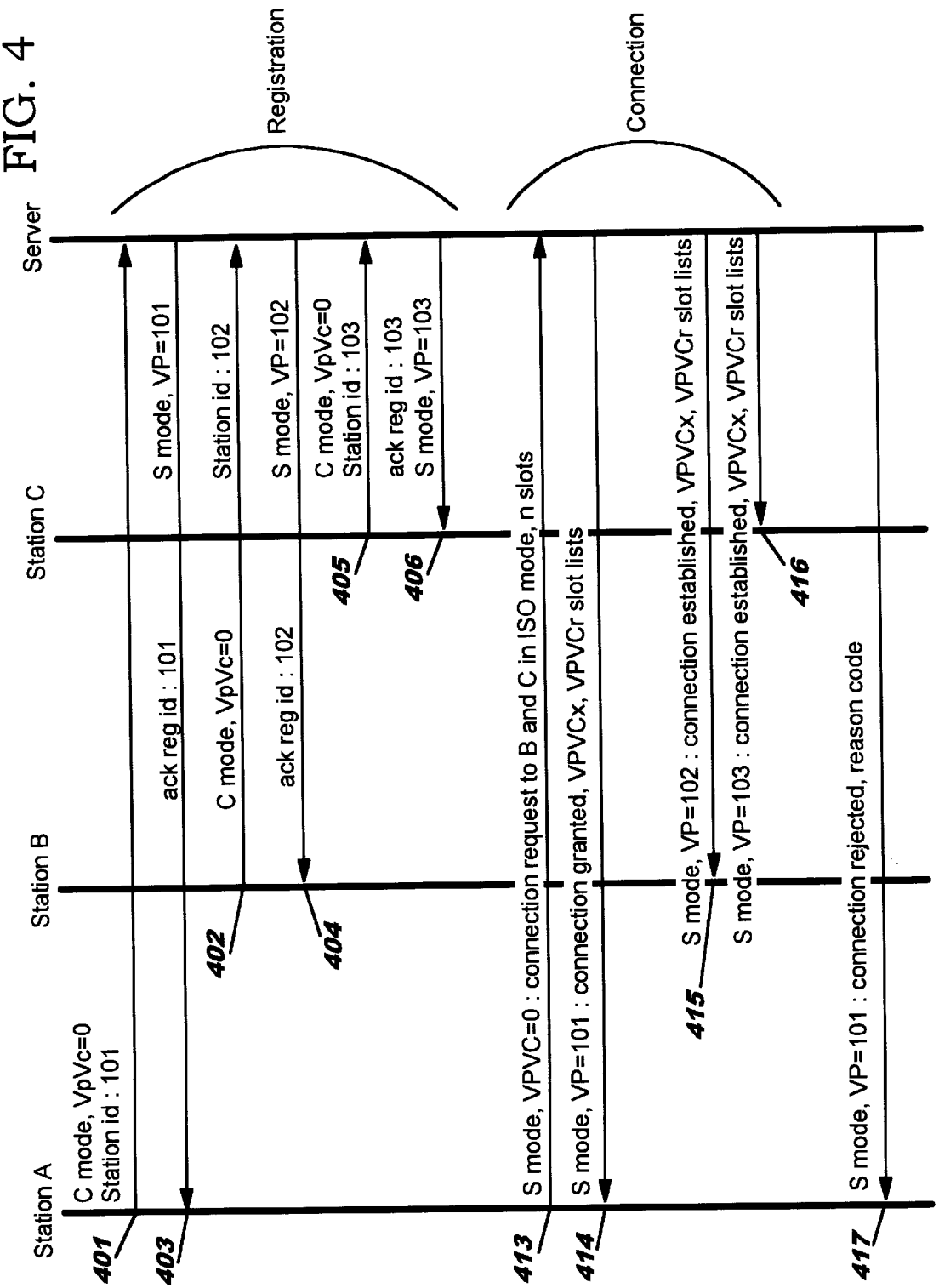
FIG. 4 illustrates the signalization and procedures involved in the communication between both stations A and B under control of the server in the ring topology.

When a station A wishes to initiate the Registration procedure, the action field of the ATM control cell is set to define the registration procedure and the parameters define the station, e.g., the ID of the station. The generation of this Registration ATM cell is illustrated in FIG. 4 with reference to line 401. For the purpose of this explanation, it will be assumed that the ID number of station A is equal to 101. It should be noted that this particular Registration cell will be sent as soon as a free frame, that is to say a frame which comes from the ring and which has an ACCESS field value being lower than that of the priority field that was defined before for generating the ATM Registration control cell, is detected by the adapter. Such a comparison between the values of the priority is performed in accordance to the mechanism that was described before with reference to FIG. 3, and particularly with the developments relating to state 04 of control machine 300.

Figure 6A:
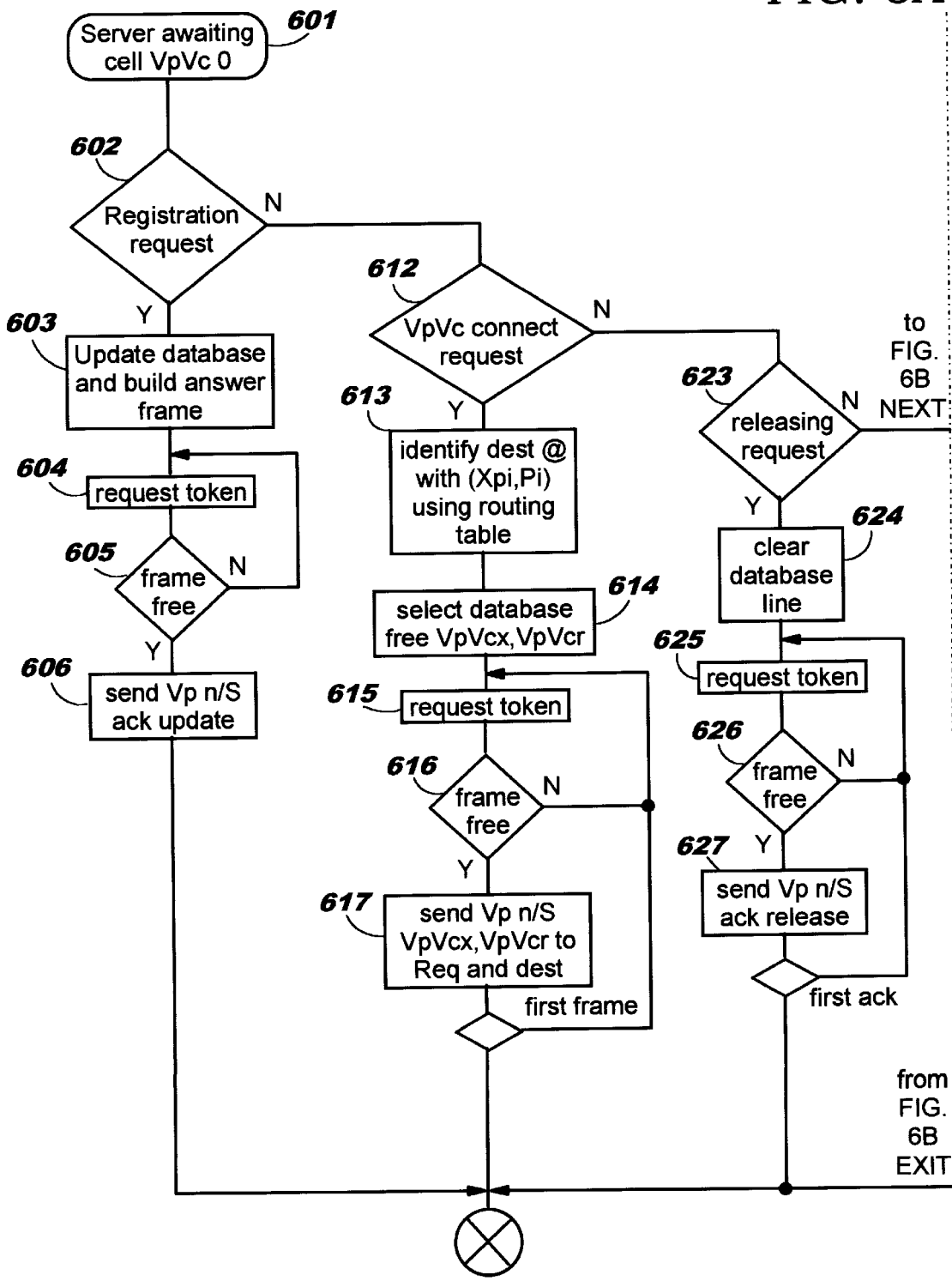
FIGS. 6A, 6B and 6C are flow charts of the protocol allowing control of the server in the ring topology.
Figure 6B:
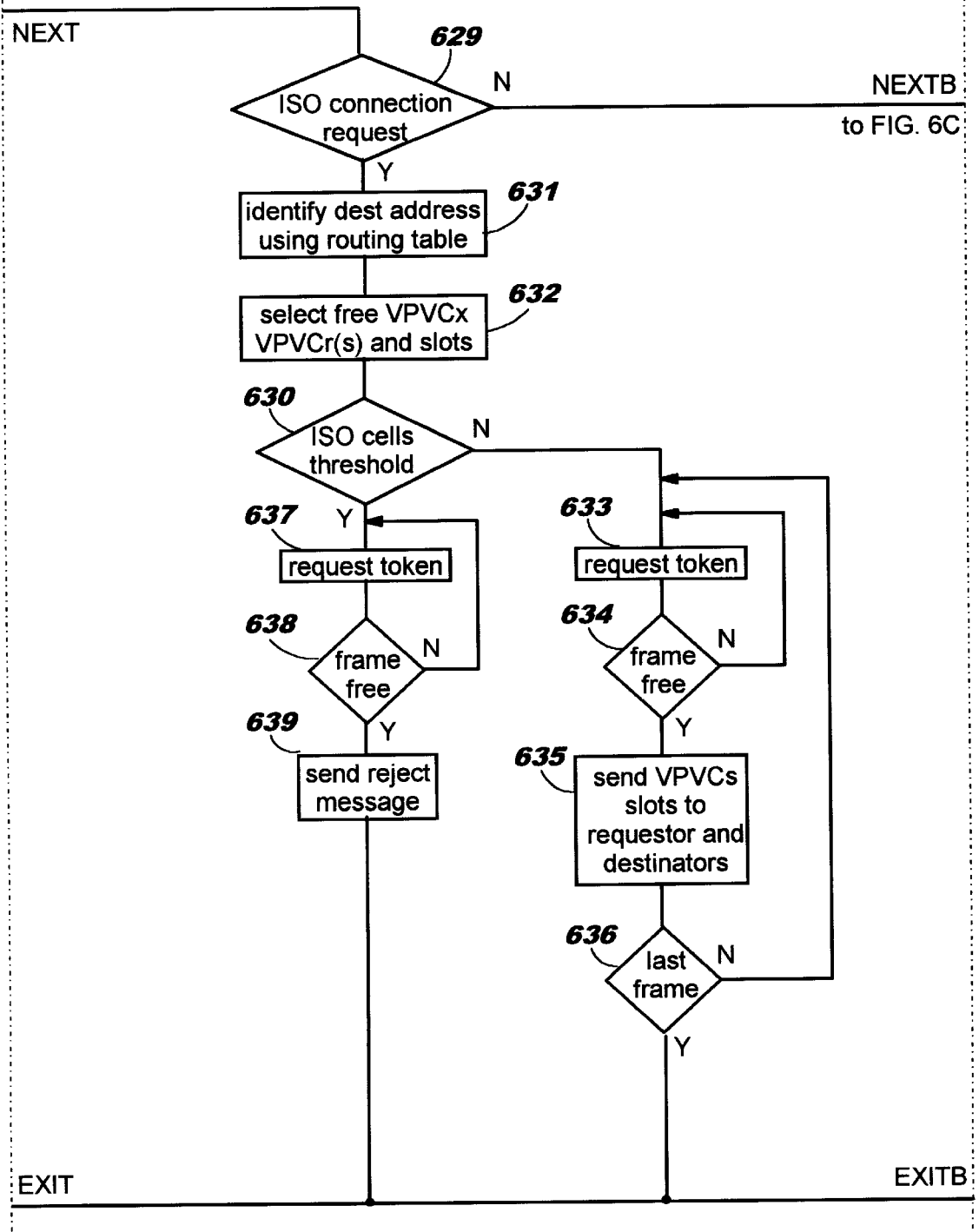
Figure 6C:
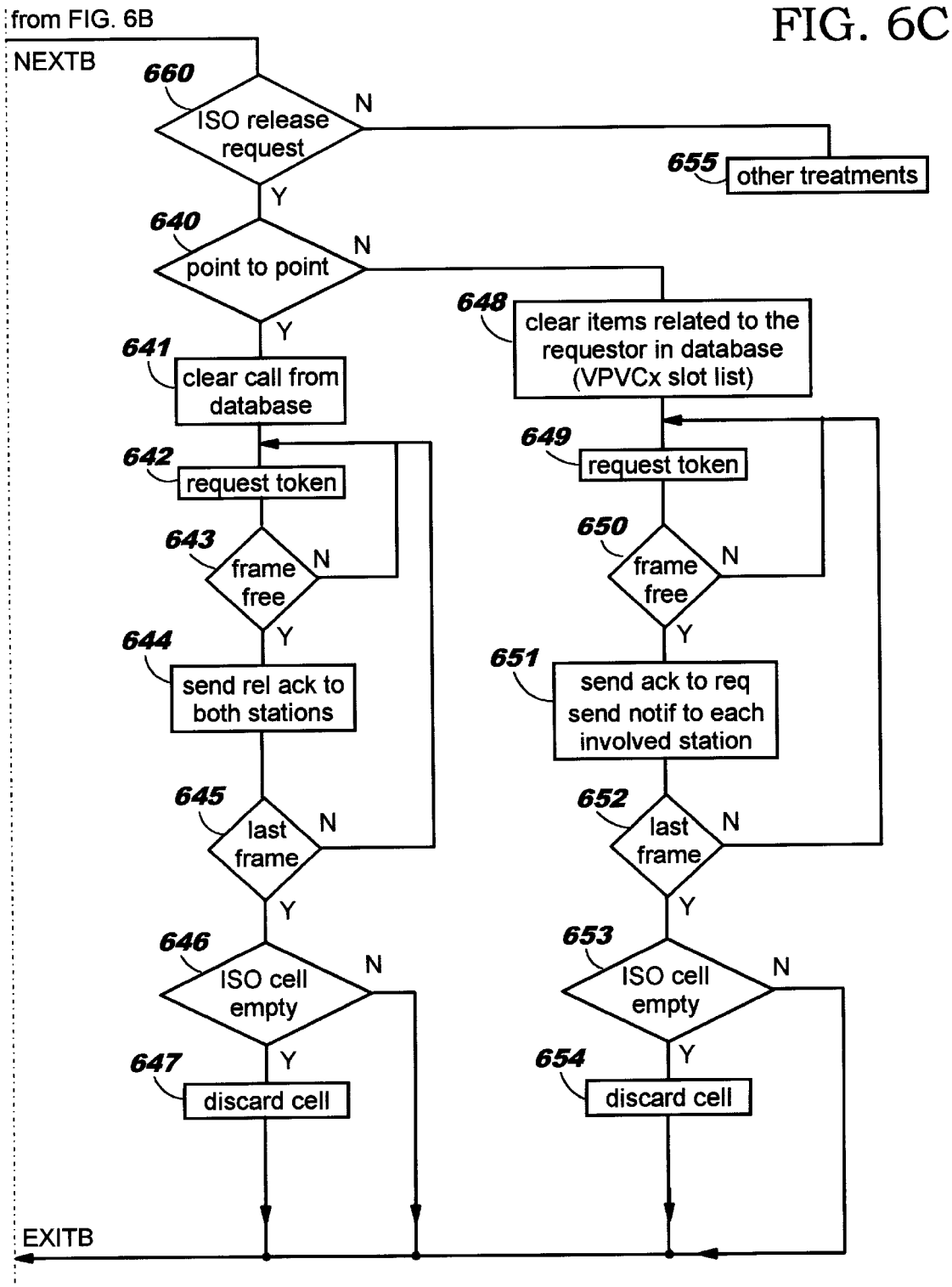

The processing of the frame transmitted by station A in the ring server complies with the general flow control that is illustrated in FIG. 6. When ring server receives this frame which VP field characterizes the ring server ID, in step 601, the ring server proceeds to step 602. This step is a test to determine whether the ACTION field in the ATM control cell defines a Registration action. In the case of a registration action, the process then proceeds to step 603 where the ring server updates its own database in order to record the station ID of the newly installed station. The appropriate operations that are involved in such an update are well known from the skilled person and will not be further discussed. The process then proceeds to the construction of an acknowledgment ATM control cell which also complies to the above-mentioned general structure. This second cell will be particularized by a VP field indicating the ID of station A that requested the registration, and one parameter set to an acknowledge bit. Then, step 604, the ring server requests the token by loading its own priority value into the 16-bit register of control machine 300. This loading process conforms to the description made with respect to states 02, 04 and 09 of FIG. 3. The process then proceeds to step 605 where the ring server waits for the occurrence of a free frame as previously described for station A. As mentioned previously, the priority values that are used for managing and processing the Registration procedure are low since the procedure is not particularly critical. If the frame is free, the process proceeds to step 606 where the previously constructed ATM cell is embedded in a frame and transmitted to the ring. It should be noted that in a particular embodiment of the invention, the ring server uses one mechanism that progressively increases the value of the priority which is used in the registration procedure as the time elapses in order to ensure that the frame is sent within a determined period of time even if the traffic is nearly loaded. The transmission of the acknowledgment of the ring server, which was described before, is illustrated in FIG. 4 with reference to line 403.

When station A receives the above-described acknowledge frame, it detects the occurrence of its own ID number inside the VP field and is therefore made aware that this frame is intended to be stored and processed. Such a determination is performed in accordance with the internal mechanisms that were described in reference to state 07 to 10 of FIG. 3. Such an information is transmitted to the upper layer of the general communication protocol. The procedures which can be initiated from this information, e.g., the flow control and error management, are handled at this upper layer and will therefore not be further described. Assuming that station A has completed a full set of consecutive registration procedures which all failed, the upper layer of the communication protocol may use the broadcast mode that was described before in order to inform all the stations existing in the ring that a major failure did occur. The reception and processing of the registration ATM control cell completes the registration procedure.

Similarly, a second station B which has an identification number being equal to 102 may also initiate a Registration procedure which is illustrated in FIG. 4 with respect to line 402, to which the ring server also answers by a corresponding acknowledgment procedure which is represented in reference to line 404 of FIG. 4.

When all the Registration procedures that were mentioned above are completed, the general communication mechanism can be initiated. This mechanism allows the communication between two stations within the ring or a station with a router located within the ring in order to access a remote station. This mechanism generally comprises three distinctive procedures: a first one consisting of a Connection Request in order to assign a VP/VC to this communication; then followed by a second Data transfer; and, at last, the Disconnection procedure that releases the VP/VC.

Figure 5:
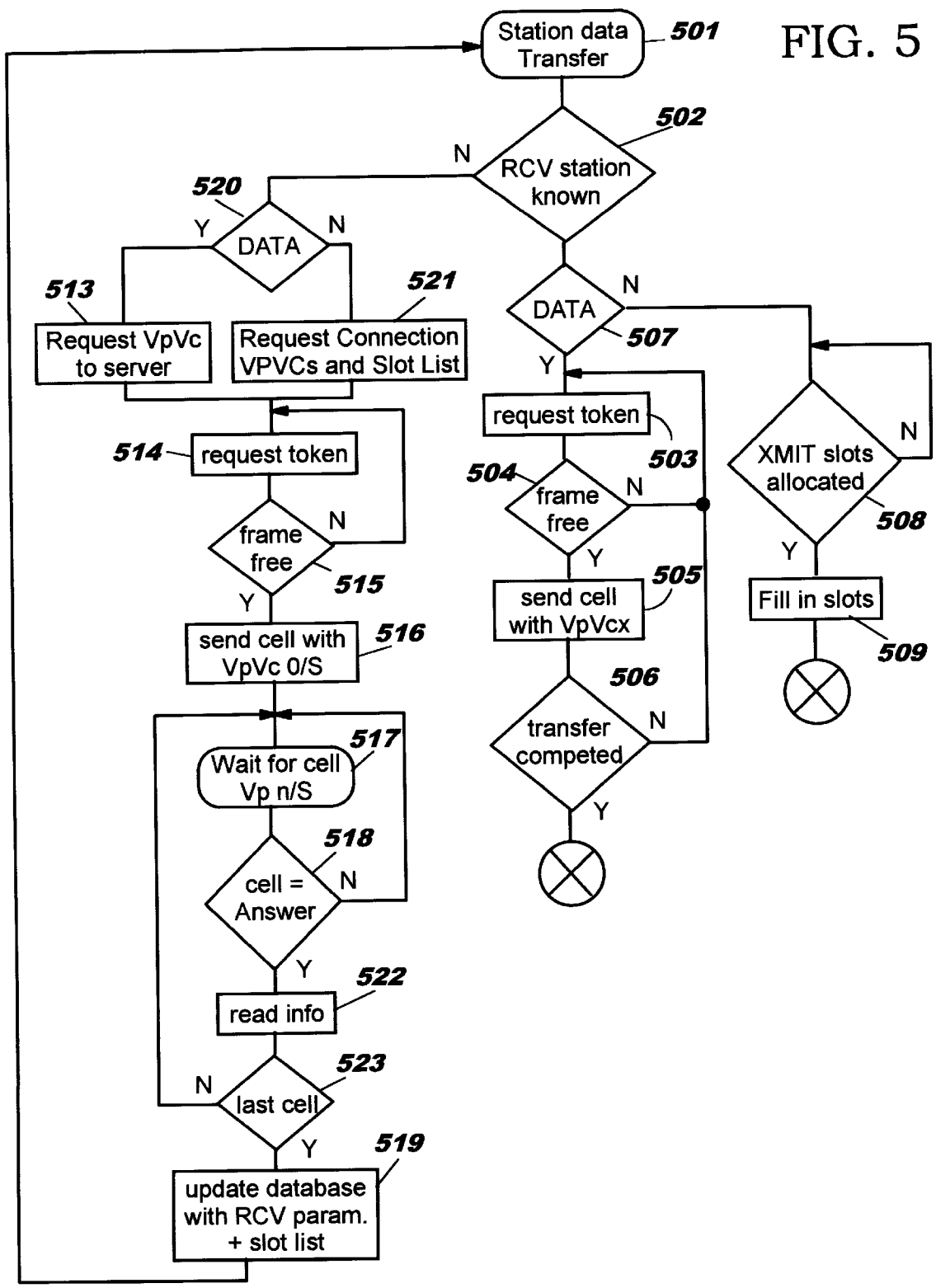
FIG. 5 is a flow chart of the protocol allowing the control of the station in the ring topology.

When a station A, for instance, wishes to transfer data to a station B, the former requests the ring server to be assigned a VP/VC for this communication in accordance with the well-known ATM procedures. This request is represented in FIG. 4 with reference to line 411 and is processed as represented in the flow diagram which is illustrated in FIG. 5. More particularly, this request is initiated in step 501. Then, a test is performed to check whether a VP/VC is already available for a data transfer between the two stations, step 502. If such a VP/VC is not available, then the process proceeds to step 513 where station A requests a VP/VC to the ring server. To achieve this, station A prepares the construction of an ATM control frame which is characterized by a VP/VC equal to the ring server ID (that is zero, for instance) with an ACTION field defining the CONNECTION value and the following additional parameters Xpi and Pi. The latter is used by the station for determining the appropriate upper layer protocol which is used, e.g., IP or X.25. Xpi is defined as the ID within the protocol. For instance, assuming that the protocol which is used is IP (I=1), the Xpi value is defined as the IP address of the destination station, e.g., "9.100.25.102." Assuming that the X.25 protocol is used (I=2 for instance), the Xpi defines the address of the destination station. Then the process proceeds to step 514 where the station A requests a token by loading its own priority value into the 16-bit register of control machine 300.

Then, in step 515 the station waits for the occurrence of a free frame, that is to say a frame which comes from the ring and which has an ACCESS field value being lower than that of the priority field that was defined before for generating the ATM Connection control cell. As was previously mentioned, such a comparison between the values of the priority is performed in accordance to the mechanism that was described before with reference to FIG. 3, and particularly with the developments relating to state 04 of control machine 300. In step 516, the station A transmits the previously constructed Connection control cell to the ring when the free frame is detected. The station then proceeds to step 517 where it waits for the occurrence of a frame coming from the server and which Vp/Vc field defines its personal identification number.

With respect to FIG. 6 again, the ring server receives the cell transmitted by station A. As it detects in the Vp/Vc field the personal identification number of the server (for instance, zero), the latter proceeds from step 601 to step 602 where it tests the contents of the ACTION field of the control cell. As this field does not contain the REGISTRATION parameter, the process proceeds to step 612 where an additional test is performed on the ACTION field to determine if the field contains a CONNECTION request.

1. In the case of a data connection request, the process goes to step 613 where the ring server extracts the parameters defining the two stations which will communicate, and identifies the corresponding Xpi and Pi parameters by means of its own routing tables in order to determine the physical personal identification number of the destination station. Then, step 614, the server chooses at least one value of Vp/Vc that will be assigned to the particular communication between station A and B. Generally speaking, this assignment involves at least one value for the transmission from station A to B (Vp/Vcx) and a second one for the reverse direction (Vp/Vcr). The ring server then proceeds with the construction of two distinctive control cells. They both have an ACTION field which is defined as being the Connection Acknowledge and a set of parameters which defines the Vp/Vcx and Vp/Vcr. The first one will be sent to station A and will therefore have a Vp field set to the ID number of this station (101 in our example) while the second one will be sent to station B by using a Vp field which is set to the ID number of the latter station (102 in our example). The process then proceeds to step 615 where a token is requested by means of a loading of the server's priority value into the 16-bit register of control machine 300 of ring server. The process then proceeds to step 616 where the server waits for the detection of a free cell, that is to say a frame which comes from the ring and which ACCESS field value is lower than that of the priority field loaded before. The process then proceeds to step 617 where the first frame is transmitted to station A. The process then reiterates the above steps 615, 616 and 617 in order to transmit the second frame which will be processed by station B. The communication of these two frames is respectively illustrated with reference to lines 412 and 413 of FIG. 4.

With respect to FIG. 5 again, station A processes the first CONNECTION Acknowledge frame in step 518 as follows. Station A checks the contents of the ACTION field and the additional parameters to determine whether this frame corresponds to the particular request it initiated before in step 513. As long as station A does not receive the expected frame, it proceeds again to step 517. On the contrary, when the frame which is received is detected to correspond to the particular request (which is the case in our assumption), the process proceeds to step 519 where station A provides the appropriate parameters to the upper communication layers. The process then proceeds to step 502 of FIG. 5.

The station B which receives the second CONNECTION Acknowledge frame is made aware that and station wishes to communicate with it and extracts the appropriate parameters in order to transmit them to the upper layer of the communication protocol.

With respect to FIG. 5 again, in the case where a Vp/Vc value has just been assigned or appears to be still assigned because of a prior communication between the two stations resulting in a Vp/Vc values which are not yet released, the process goes to step 503. In step 503 station A can request the token by loading its own priority value into the 16-bit register of control machine 300. Then, step 504, station waits for a free frame, that is to say a frame which comes from the ring and which has an ACCESS field value being lower than that of the previously loaded priority field. On the occurrence of such a free frame, the process proceeds to step 505 where the station can initiate the transfer of the first data cell using Vp/Vcx. The process then proceeds to step 506 where a test is performed in order to check if the full data transfer is completed or if additional cells need to be transmitted. In the first case, the communication session can be completed and the station A can proceed to the releasing of the Vp/Vcx and Vp/Vcr which were provided by the ring server. This is achieved by the transmission of a specific control cell to the server which it will decode as a Release request in step 623 of FIG. 6. This will result in the clearance of the Vp/Vc in the database of the ring server, step 624, so that this value becomes available for further communication requests. After the latter release, the ring server transmits a RELEASE ACKNOWLEDGE frame to the two stations A and B. This involves requesting the token in step 625 in a similar way as described before, followed by a test 626 to determine the existence of a frame being free. In such a case, the RELEASE ACKNOWLEDGE frame can be transmitted in step 627.

In the second case, station A proceeds further with the communication until the last data cell is transmitted. This is achieved by proceeding to step 503.

2. In addition to the features disclosed in the related document, the preferred embodiment of the present invention is dedicated to isochronous connection requests. Should the occasion arise, the process goes to step 631 where the ring server extracts the parameters defining the stations which will communicate, and identifies the ID of the destination station(s) using its routing table. At step 632, the server allocates free VpVc/slotlist for the connection. The server checks if the threshold of isochronous cell is reached during step 630. If it is not the case, then step 630 is processed. The server chooses 'VpVc/slotlist' for transmission and reception of each of the involved stations. The ring server then proceeds with the construction of distinctive control cells (one per involved station). They have an ACTION field which is defined as being the connection Acknowledge and a set of parameters which defines the transmit VpVc/slotlist and the receive VpVc/slotlist (used on transmission by each other's involved station). The first one will be sent to station A and therefore have a Vp field set to ID number of this station (101 in our example), while the others will be sent to the other involved stations, using a Vp field which is set to their respective ID numbers. The process then proceeds to step 633 where a token is requested by means of a loading of the own priority value into the 16-bit register of control machine 300 of the ring server. The process then proceeds to step 633 where a token is requested by means of a loading of the own priority value into the 16-bit register of control machine 300 of the ring server. The process then proceeds to step 634 where the server waits for the detection of a free cell, that is to say a frame which comes from the ring and the ACCESS field value of which is lower than that of the priority field loaded before, otherwise it loops back to step 633. The process then proceeds to step 635 where the first frame is transmitted to station A. The process then reiterates the above steps 633, 634, 635 until an Acknowledge frame is sent to each of the involved stations. As long as the last frame is not transmitted, step 636, the process loops back to step 633. The communication of these frames is respectively illustrated with reference to lines 414, 415, 416 of FIG. 4.

If at step 630, the threshold is reached, the server requests a token at step 637 and waits for the detection of a free frame at step 638 as in steps 633 and 634. Finally, the server sends a reject frame to station A at step 639.

When a station wants to terminate the isochronous connection, it sends an 'isochronous release request' control message to the server. The server checks if the connection involves more than 2 stations at step 640.

If only two stations are involved, the server clears the call from its database at step 641 (frees the VpVc/slotlist used by the call). It sends a release Ack message to both stations at steps 642 to 645. More accurately, after requesting a token at step 642, waiting for the detection of a free cell at step 643, the server sends a release acknowledgment to both stations at step 644, and the three steps are performed until the last frame has been detected at step 645. If the isochronous cell used by this call is now empty at step 646, the server discards it at step 647 and ends the process; otherwise, the server ends the process without discarding the isochronous cell.

If more than 2 stations are involved, the server frees the VpVc/slotlists which were assigned to the releasing station's transmission at step 648. It sends a 'release ack' message to the requesting station. More accurately, after requesting a token at step 649, waiting for the detection of a free cell at step 650, the server sends a release acknowledgment to the releasing station. It also sends a notification to other stations which were part of the connection. This notification includes the Vp/Vc/slotlist used by the releasing station for its transmission. The other stations will update the content of RAM 700 to stop reading the VpVc/slotlist on reception. If the isochronous cell including the removed VpVc/slotlist is now empty at step 653, the server will discard it at step 654 and the process ends. Otherwise, the process ends without discarding the isochronous cell.

Other treatments than those mentioned above may be requested at step 655, but it is not in the scope of the present invention.

It should be noted that the structure which was described permits each station to operate with two or more identifiers. This provides great advantage. In particular, when the ring station (ID=0) happens to fail, another station can be assigned the ID identifier of the ring station so that the ring can continue to operate. This allows each station to virtually operate as a ring station.

Besides, since each adapter uses shift registers (190, 250), each frame can be entirely loaded into the shift registers when the number of stations increases. Indeed, a set of twenty stations provides the possibility to store and forward 60 bytes, that is to say one ATM cell. However, if the number of the networks is higher, one may envisage the possibility to load more than one ATM cell in the network which results in an increase of the throughput of the communication.

Also, assuming that an ATM cell is to be transported between two stations which are close to one another, or even adjacent, it appears that the frame is accessed during a very short time since the first station accesses the frame (by setting the highest priority to the ACCESS field) which can, then, be rapidly released by the second station which receives the frame. Therefore, the frame becomes available before it has performed a full turn inside the ring. This also entails an increase in the effective throughput of the ATM ring communication. This effectiveness still increases with the size of the ring.

Furthermore, it should be noted that each station may be fitted with two separate adapters, each one being dedicated to one direction. Therefore, a double direction ring topology is provided which allows reliability and effectiveness. In particular, by controlling the appropriate direction which should be used for transporting an ATM cell between two stations in response to the traffic existing in the other one, it becomes possible to greatly optimize the communication in the ring and the throughput.

Finally, in another embodiment, the frame structure comprises an additional field which is used for increasing the number of address bits which are dedicated for characterizing the VP/VC communication (which is already defined in the header of the ATM cell). It should be noted that the invention may be embodied in a network which uses non-ATM fixed cells (for instance, having 64 bytes) as well as for variable length cells.

What is claimed is:

1. Apparatus comprising:

a plurality of station adapters connected in a ring network and defining a first station, a second station and a third station, said third station operating as a ring server controlling and managing isochronous traffic; and a flow of data frames communicated among said stations, each of said frames having a Frame starting delimiter (START), a TOKEN field used by each station to request access to the next frame, an ACCESS field including a first LEVEL field, a field receiving the contents of an asynchronous transfer mode (ATM) cell, and a frame ending delimiter (STOP);

each of said frames being one of a first type and a second type;

said first type of frame being an isochronous control cell containing a cell header, a sequence number field (Snum), a typs of command field (Action) and a parameter field for establishing and managing connections between said station adapters;

said parameter field containing a slotlist in which slots are allocated for sharing of data cells by a plurality of different connections;

said second type of frame being an isochronous data cell containing a header and a payload divided into N number of m bit slots for exchanging data via established connections;

said server station providing to each established connection a transmit identifier in the header associated with a list of allocated slots for transmission and a receive identifier in the header associated with a list of allocated slots for reception from other linked stations.

2. Apparatus according to claim 1 further comprising first and second registers respectively dedicated to the slots in receive operation and in transmit operation so as to concatenate bytes stored in memory in receive operation and overwrite bytes in the corresponding slots in transmit operation by associating each bit of both registers to a data byte of the isochronous data cell.

3. Apparatus according to claim 2 wherein said first and second registers are disabled when a processed cell is not isochronous as determined by detection of a Vp range address (Vp>=F0).

4. A method comprising the steps of:

establishing an isochronous connection between a plurality of adapters connected in a ring network which define a first station, a second station, and a third station which operates as a ring server controlling and managing data frames each of which has a Frame starting delimiter (START), a TOKEN field used by each station in requesting access to the next frame, an ACCESS field including a first LEVEL field, a field receiving the contents of an ATM cell, and a Frame ending delimiter (STOP);

each of said frames being one of a first type and a second type;

said first type of frame being an isochronous control cell containing a cell header, a sequence number field (Snum), a typs of command field (Action) and a parameter field for establishing and managing connections between said station adapters;

said second type of frame being an isochronous data cell containing a header and a payload divided into N number of m bit slots for exchanging data via established connections; by requesting the server with an isochronous control cell generated by a station;

generating at the server an isochronous data cell containing the requested bandwidth on the ring;

processing isochronous data cells at stations connected on the ring allowing a simple multicast of the cell on the ring;

storing in the server the isochronous data cell after a ring turn; and retransmitting the cell on the ring after a predetermined time period; and releasing an isochronous connection by requesting the server by sending an isochronous control cell with a release command in the action field; and releasing slots corresponding to the connection and discarding the isochronous data cell if all the slots are released.

5. A method according to claim 4 wherein the step of processing comprises:

receiving an isochronous data cell at a station;

performing one of overwriting the allocated transmitted_slots and reading data bytes from the allocated received_slots; and forwarding the isochronous data cell on the ring without modifying other slots.

6. A method comprising the steps of:

establishing an isochronous connection between a plurality of station adapters and a server station connected in a ring network with asynchronous transfer mode (ATM) cells included in an ATM frame which has start delimiter, a token used to request access to the next frame, an access field including a level value, an ATM cell and a stop delimiter by transmitting from the station adapters and the server station ATM frames having a first ATM isochronous control cell including a header, a sequence number, a command and a parameter field including sending a connection request from a station adapter to the server station via an isochronous control cell which includes the identity of at least one other station adapter; and sending a response via an isochronous control cell from the server station to the requesting station adapter including an indicia of the allocated bandwidth and notification of the connection information to the other station adapter;

periodically transmitting from the server station an ATM frame having a second ATM isochronous data cell having N data slots of m bits each in which authorized station adapters exchange data signals in the allocated bandwidth; and at the termination of the communication sending the server station a request to terminate the connection in an ATM isochronous control cell; and releasing the bandwidth allocated to the connection and discarding the AT<isochronous data cell if no bandwidth in the cell is in use.

7. The method set forth in claim 6 in which the allocation and notification of bandwidth is accomplished by sending the adapter stations involved in the requested connection lists of the transmit and receive slots assigned by the server station to the connection in the parameter field.

8. The method set forth in claim 7 in which the N slots of m bits in the isochronous data cell are selectively allocated to different connections by the server station and the allocation is communicated to the station adapters via a slot list.

9. The method set forth in claim 8 in which the number of slots N equals 48 and the number of bits m is equal to 8.

* * * * *